Feb. 20, 1968  K. C. FORD  3,369,684
TRUCK BED

Filed Aug. 16, 1965  2 Sheets-Sheet 1

INVENTOR.
KENNETH C. FORD
BY
*Fishburn & Gold*
ATTORNEYS

Feb. 20, 1968  K. C. FORD  3,369,684
TRUCK BED
Filed Aug. 16, 1965  2 Sheets-Sheet 2
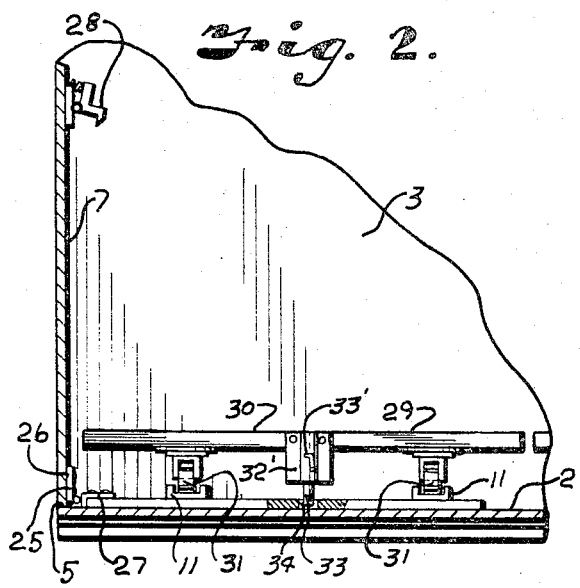
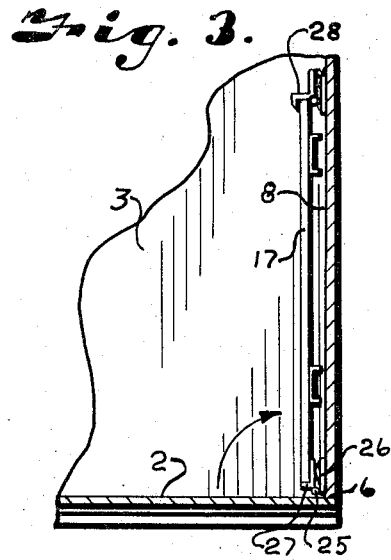
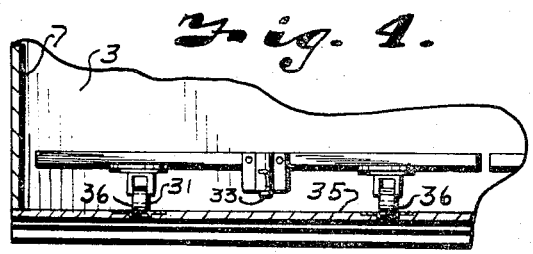
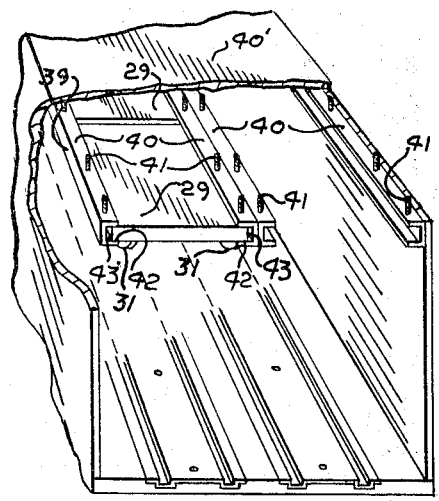
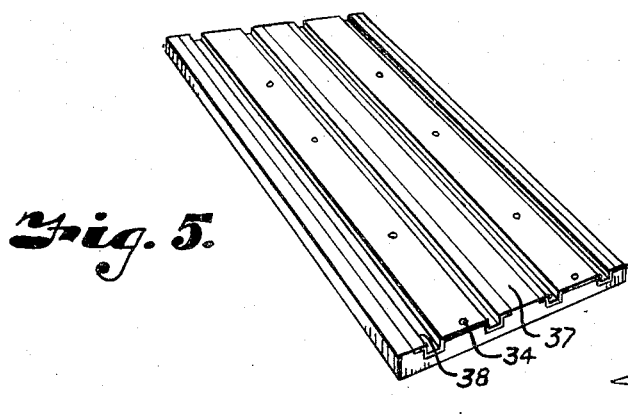
INVENTOR.
KENNETH C. FORD
BY
*Fishburn and Gold*
ATTORNEYS

United States Patent Office 3,369,684
Patented Feb. 20, 1968

3,369,684
TRUCK BED
Kenneth C. Ford, 6101 W. 87th Terrace,
Overland Park, Kans. 66207
Filed Aug. 16, 1965, Ser. No. 479,914
2 Claims. (Cl. 214—515)

ABSTRACT OF THE DISCLOSURE

A truck bed includes means forming longitudinal tracks adapted to receive wheeled dollies thereon. The tracks may be formed in sections pivotally secured at the sides of the bed for swinging upwardly when not needed. Latches are provided to hold the track sections in the vertical position and co-operative latching structure is provided between the dollies and the track sections for selectively maintaining the dollies in desired positions on the tracks. Overhead storage means for the dollies include facing spaced-apart channels slidably receiving the dollies longitudinally on the ceiling of the truck.

---

This invention relates to load handling and more particularly, to apparatus which greatly facilitates loading goods in a truck having an elongated bed with rear access.

It is the common practice in loading elongated truck beds to back the truck to a position where the rear portion is adjacent a warehouse platform or the like, whereupon the load is received therein. In loading the truck, the goods are normally carried in relatively small loads, either by hand or upon small transfer wagons from the rear of the truck bed adjacent the platform to the forward end of the truck bed where they are deposited. The load handler then returns to the platform to pick up another relatively small load which is subsequently carried back toward the front of the bed and deposited rearwardly adjacent the first load. This sequence is repeated until the entire truck bed is covered to the desired height and the sequence is merely reversed for unloading. The large number of trips back and forth longitudinally of the truck bed is both time consuming and inefficient, resulting in substantial increases in transportation costs.

The principal objects of the present invention are: to provide apparatus to be used in combination with an elongated truck to substantially reduce the loading and unloading time thereof; to provide track and dolly apparatus which permits relatively large portions of the total truck load to be urged into loaded position from the rear of the truck without auxiliary power equipment; to provide such apparatus which locks the load at a desired position in the truck; to provide such apparatus which may be selectively used or rendered inoperative without removal from the truck; to provide such apparatus whenein the dollies may be conveniently stored in the truck when not in use; and to provide such apparatus which is easily installed in existing trucks and which is simple and inexpensive in construction but highly effective for its intended purposes.

Other objects and advantages of this invention will become apparent from the following description taken in connection with the accompanying drawings wherein are set forth by way of illustration and example certain embodiments of this invention.

FIG. 2 is a fragmentary cross-sectional end elevation showing a dolly engaged in tracks and further showing a locking member on the dolly.

FIG. 3 is a fragmentary cross-sectional end elevation showing a track section pivoted upwardly into inoperative position.

FIG. 4 is a fragmentary cross-sectional end elevation showing a modified form of truck bed embodying this invention.

FIG. 5 is a perspective view illustrating a planar member having grooves therein for conveniently converting an existing truck to apparatus embodying the form of this invention illustrated in FIG. 4.

FIG. 6 is a fragmentary perspective view showing storage members for unused dollies.

Figure 1:
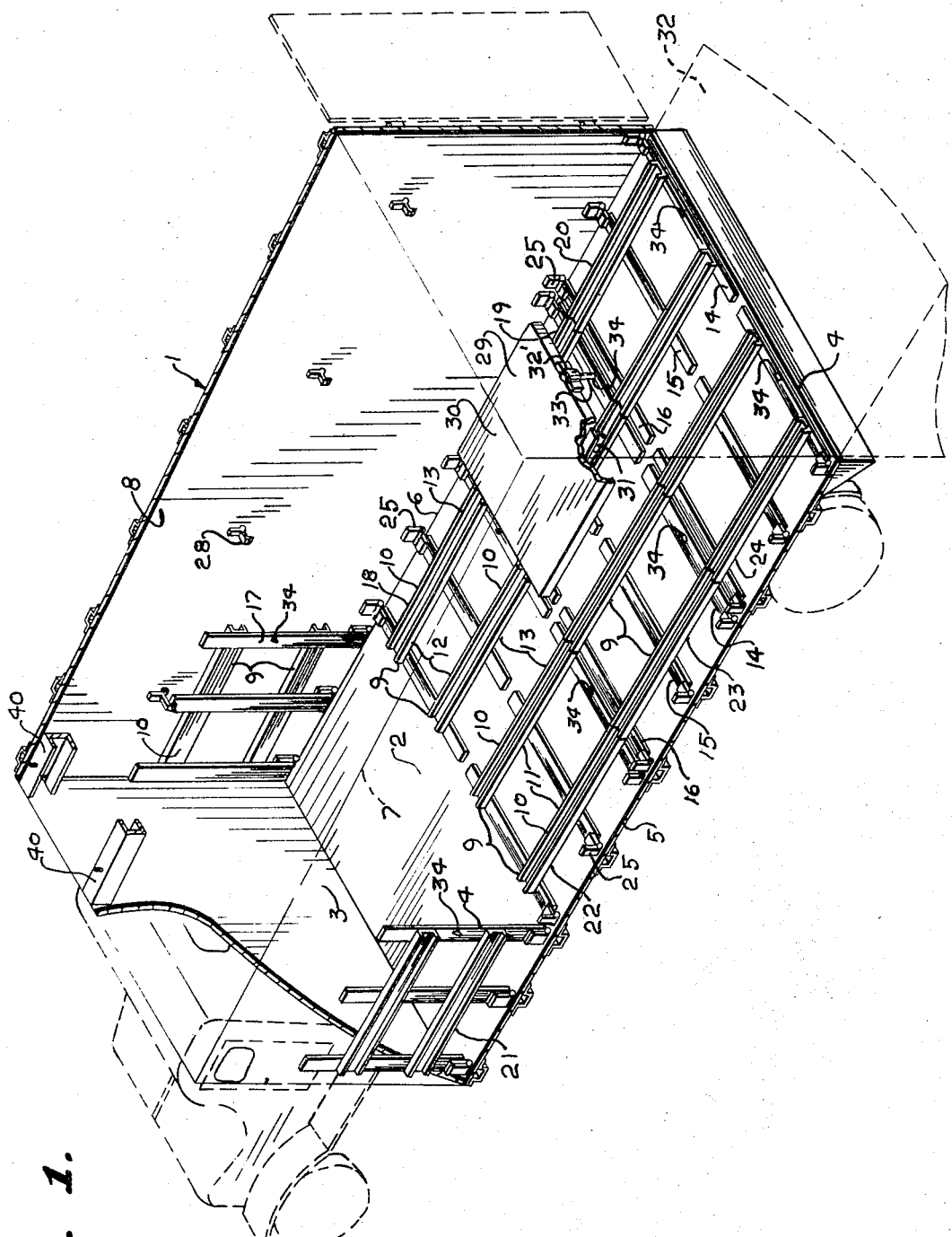
FIG. 1 is a fragmentary perspective view showing an elongated truck bed with track and dolly apparatus thereon embodying this invention.

Referring to the drawings in more detail:

The reference numeral 1 generally indicates a trucking vehicle embodying this invention. The vehicle 1 includes an elongated horizontal bed 2 having a front end 3 and a rear end 4 and side edges 5 and 6. Side walls 7 and 8 extend upwardly from the respective side edges 5 and 6 in the usual manner.

A plurality of pairs 9 of laterally spaced track members 10 extend in end-to-end aligned relation longitudinally of the bed 2. The pairs 9 together form two spaced apart sets 11 and 12 of substantially continuous tracks 13 extending substantially the length of the bed 2. Transverse bar members 14, 15 and 16 are respectively rigidly secured to the pairs 9 of track members, for example, by welding, and maintain the respective track members of each pair in the spaced apart aligned relation noted above. The transverse members 14, 15 and 16, in the illustrated example, each have a length less than one-half the width of the bed 2 and normally extend transversely along the bed, resting thereon, and terminate with one end thereof adjacent the respective bed side edges 5 and 6. The respective pairs 9 of track members and the respective sets of bar members 14, 15 and 16 form a plurality of separate rigid track sections 17 through 24 which are dimensioned to cover substantially the entire surface of the bed 2 when positioned in side-by-side relation. A plurality of hinges 25 have one anchor portion 26 thereof (FIG. 2) secured to the vehicle adjacent the bed side edge 5 or 6 and the other anchor portion 27 secured to the respective transverse member 14, 15 or 16 to permit the track sections to selectively pivot upwardly against the respective side walls 7 and 8 and thus expose the bed as best illustrated in FIG. 3. Suitable latch members 28 (which may be recessed into the side walls, if desired) are secured to the respective side walls 7 and 8 and are adapted to engage the respective track sections 17 through 24 to selectively retain same in upwardly extending position as illustrated in FIG. 3.

A plurality of dollies 29 each comprise a platform portion 30 having a width preferably only slightly less than one-half the width of the bed 2 and a length which is substantially equal multiple of the length of the bed 2, whereupon when the platforms 30 are suitably arranged, they substantially cover the entire bed area of the vehicle. The platforms 30, in this example, each have four downwardly projecting wheels 31 spaced apart a distance permitting simultaneous engagement of the wheels in the track sets 11 or 12. The dollies 29 are preferably constructed so that two of the wheels 31 may swivel to aid in directing the dolly on a dock surface 32 so as to easily align same with the respective track set.

The dollies 29 each have a latch member 32' which, in this example, includes a latch bolt 33 adapted to be selectively projected downwardly when desired. Each of the bar transverse members 14 have a receiving bore 34 therein positioned to receive the bolt 33 when the dolly 29 is in a desired position and thus, prevent movement of the dolly along the respective track set. The bolt 33 is withdrawn upwardly and locked into withdrawn position with a pin retainer 33' when freedom of travel along the track is desired.

In use, the track sections 17 through 24 are moved into the horizontal position (FIG. 2) whereupon the respective track sets 11 and 12 extend along the entire length of the bed from the rear end 4 to the front end 3. A dolly 29 is placed on a track set adjacent the rear end 4 and loaded with goods to a desired height. While loading, the bolt 33 may be extended into the rearmost transverse member 14 to prevent unwanted movement of the dolly along the tracks. When the dolly is loaded, the bolt 33 is withdrawn and the dolly and load are urged along the track as far forwardly as possible and locked into position over the forwardmost available track section. Additional dollies 29 are loaded and urged forwardly and locked into position in the same manner until, upon loading the rearmost dolly, the vehicle is completely filled and ready for over-the-road transfer.

Unloading at the destination is accomplished by reversing the above procedure, the apparatus permitting relatively large portions of the load to be brought to the rear of the truck quickly and without the large number of trips usually required for this purpose. If the type of load makes the use of the dollies 29 unfeasible, the respective track sections are pivoted upwardly and latched into vertical position exposing the bed 2.

A second embodiment of this invention is illustrated in FIG. 4 wherein the bed 35 has metal reinforced shallow grooves 36 extending therealong for receiving the wheels 31 of the respective dollies. The bed 35 is here of the type which is preferably installed during original construction of the vehicle. The depressed grooves 36 normally do not interfere with a load which is not suitable for placement on the respective dollies.

FIG. 5 illustrates an elongated planar member 37 which may be used to convert existing trucks to the type of bed described in connection with FIG. 4, thus doing away with individual track sections adapted to be pivoted upwardly. The planar member 37 has grooves 38 therein similar to grooves 36. If desired, the member 37 may be formed in multiple sections and bolted or otherwise fastened to the bed of the vehicle so as to provide a permanent installation presenting grooves for receiving the wheels of the dollies.

FIG. 6 illustrates storage members 39 for receiving unused dollies. The storage members 39 are comprised of spaced apart pairs of facing parallel channels 40 secured to the truck ceiling 40' by suitable hangers, in the illustrated example, bolts 41. The pairs of channels from facing grooves 42 which simultaneously slidably receive side edges 43 of the dollies, the wheels of the dollies depending below and between the respective channels. The storage members 39 and dollies therein take up little vertical space and thus do not materially interfere with the normal use of the vehicle.

Although certain forms of this invention have been illustrated and described, it is not to be limited thereto except insofar as such limitations are included in the claims.

What is claimed and desired to secure to Letters Patent is:

1. In combination;
    (a) a trucking vehicle including an elongated horizontal bed having a front end and a rear end and side edges, side walls extending upwardly from said side edges, a ceiling above said bed,
    (b) track forming means on said bed comprising a plurality of pairs of laterally spaced track members extending in end-to-end aligned relation longitudinally of said bed forming a set of substantially continuous tracks extending substantially the length of said bed, transverse members respectively rigidly secured to said pairs of track members and maintaining the track members of each pair in said spaced-apart aligned relation, said respective pairs of track members and transverse members together forming a plurality of dolly supporting rigid track sections,
    (c) a plurality of hinges having one anchor portion thereof secured to said vehicle adjacent said bed side edges and the other anchor portion thereof secured to said respective transverse members to permit said track sections to pivot upwardly against one of said side walls,
    (d) latch means secured to said side walls and adapted to engage said sections to selectively retain said sections in upwardly pivoted position,
    (e) selected transverse members having a receiving bore therein and each of said dollies having a latch member thereon adapted to be projected into said bore for locking said dolly in desired position on said tracks, and
    (f) storage means for said dollies comprising a pair of facing channels, means securing said channels to said ceiling in spaced-apart parallel relation, said channels forming facing grooves for simultaneously slidably receiving side edges of said dollies therein.

2. In combination with a trucking vehicle having an elongated bed, sidewalls, a ceiling coextensive with said bed and track means extending longitudinally on said bed and adapted to simultaneously support wheeled dollies in paired side by side relation transversally of said bed, storage means for said dollies comprising:
    (a) a plurality of elongated narrow parallel support members secured in said vehicle,
    (b) said support members presenting at least two pairs of horizontal strip legs extending substantially the length of said bed, the legs of each pair of legs being spaced-apart a distance greater than the transverse distance between wheels on a dolly and less than the overall horizontal width of a dolly and projecting toward each other, said legs being spaced downwardly from said ceiling a distance generally corresponding to the vertical thickness of said dollies,
    (c) whereby rows of said dollies are supportable in said vehicle in side by side relation adjacent said ceiling with the undersides of said dollies exposed permitting access to any of said rows without disturbing another row.

References Cited

UNITED STATES PATENTS

| | | | |
|---|---|---|---|
| 2,605,912 | 8/1952 | Small et al. | 244—118 X |
| 2,678,139 | 5/1954 | Gildersleeve. | |
| 2,825,600 | 3/1958 | Macomber | 105—371 X |
| 2,858,774 | 11/1958 | Batten | 214—38 X |
| 2,869,920 | 1/1959 | Torbin | 105—375 X |
| 3,084,816 | 4/1963 | Bozio | 214—83.24 |

GERALD M. FORLENZA *Primary Examiner.*

ALBERT J. MAKAY, *Assistant Examiner.*